United States Patent Office 2,818,219
Patented Dec. 31, 1957

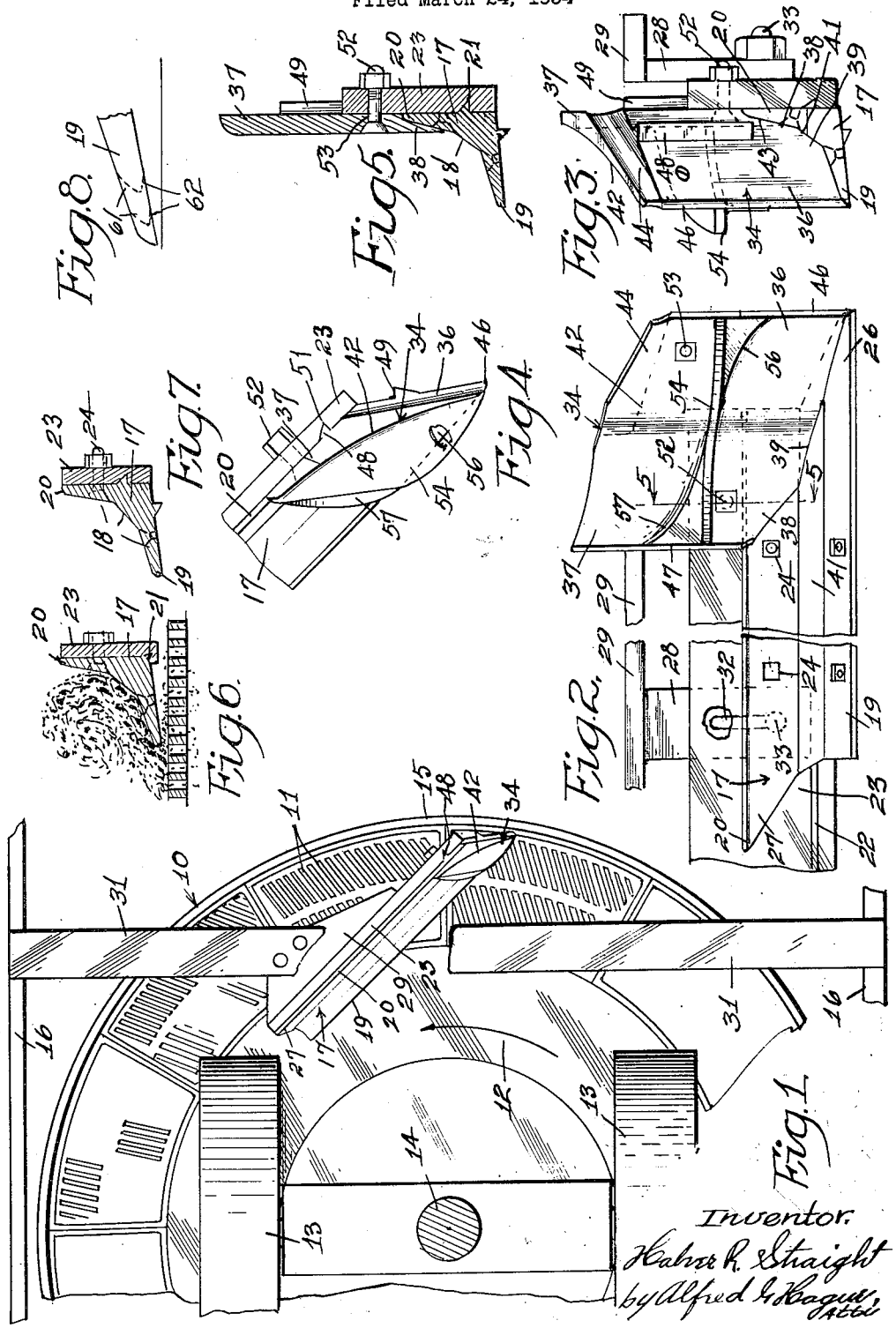

2,818,219

DRY PAN SCRAPER

Halver R. Straight, Adel, Iowa, assignor to Straight Engineering Co., Adel, Iowa, a corporation of Iowa Application March 24, 1954, Serial No. 418,282

11 Claims. (Cl. 241—119)

This invention relates to an improved dry pan scraper adapted to be used in that type of crusher employing a circular dry pan having near its periphery an annular screen formed of a plurality of detachable screen plates with its solid and central portion supporting a pair of upright and spaced crushing mullers. The pan is supported on a vertical shaft and rotates in a horizontal plane beneath the mullers. The material to be crushed is fed to the top surface of the pan and caused to pass beneath the mullers as the pan is rotated, the material being moved toward and over the screens by centrifugal force with the fines passing downwardly through the screens by centrifugal force with the fines passing downwardly through the screens by gravity. The coarse material is returned to the central portion of the pan by means of vertical and diagonally arranged and stationary scraper blades, the lower edges of the scraper blades being supported a slight distance above the pan to prevent engagement with the top surface of the pan, with the result that a small portion of the material passes beneath the lower edge of the scrapers and the remaining portion is moved toward the solid central portion of the pan and directed to position under the mullers.

After the crushes have been used for some time the front side of the lower edge of the scraper blade becomes worn with a round corner, causing the material being crushed to wedge between said lower edge and the upper surface of the pan, resulting in a great increase in power to drive the pan, in clogging of the openings in the screens, and frequent renewal of the scrapers.

It is therefore the object of my invention to provide in dry pan crushers, improved means for delivering the uncrushed material from the top of the screens to the central portion of the pan, to a position to be traversed by the mullers, wherein the objections referred to above are largely overcome.

A further object of my invention is to provide in a scraper blade embodying a plurality of cutting edges; improved means attachably and adjustably mounting the blade to operating position.

A further object of my invention is to provide in connection with a normal scraper blade; an auxiliary blade adapted to be detachably and reversibly attached to the leading end of the first blade, to deliver material from the inner face of the pan rim to the leading end of the first blade.

My invention consists in the construction, arrangement and combination of the various parts of device, whereby the objects contemplated are attained, as hereinafter more fully set forth, pointed out in my claims and illustrated in the accompanying drawings, in which:

Fig. 1 is a top view of a segmental portion of a dry pan and its mullers supported therein, showing the manner that my improved dry pan is mounted therein.

Fig. 2 is an enlarged front elevation of my improved dry pan scraper, a portion being broken away.

Fig. 3 is an end elevation of Fig. 2.

Fig. 4 is an enlarged plan of the outer end of the scraper blade.

Fig. 5 is an enlarged detail sectional view taken on the line 5—5 of Fig. 2.

Fig. 6 is a slightly modified diagrammatic sectional view of my improved scraper blade and a portion of the screen showing the manner that the scraper rolls move the uncrushed material toward the center of the pan.

Fig. 7 is another slightly modified form of scraper blade.

Fig. 8 illustrates diagrammatically, progressive stages of wear of the cutting edge of the blade.

In the drawings I have used the numeral 10 to indicate a dry pan of the type to which my improved scraper blade is adapted to be applied, including detachable screens 11 and a crushing plate 12. Mullers 13 are mounted to travel over the plate 12. The pan 10 is mounted on a shaft 14 to rotate in an anti-clockwise direction beneath the mullers 13, as indicated by the arrow in Fig. 1. The shaft 14 is mounted in a supporting frame 16 only a portion of which is illustrated.

My improved scraper blade comprises an elongated body 17 formed preferably of cast metal and substantially triangular in cross section with its hypotenuse side grooved or hollowed out to provide what I shall term a concaved deflector surface 18. The sides of said body terminate in cutting flanges 19 and 20, and the junction of said sides terminates in a V-shaped rib 21 adapted to be supported in a V-shaped groove 22 (see Fig. 6) formed in the lower edge of a blade supporting plate 23 by bolts 24. One end of the flange 19 is formed with a triangular portion 26 while the opposite end of the flange 20 is provided with a triangular portion 27, the portion 26 being the leading end of the scraper when the flange 19 is used as the cutting edge, as illustrated in Figs. 1 and 2.

It will readily be seen that the flange 20 may be used as a cutting edge by simply removing the bolts 24 and reversing the scraper blade end to end with the flange 20 in a horizontal position and the flange 19 in a vertical position with the rib 21 again placed in the groove 22, thus providing a reversible scraper blade.

The scraper supporting bar 23 is adjustably mounted on hanger straps 28 depending from the upper surface of a horizontal bracket 29 attached to the under surface of a supporting bar 31, which is carried by the frame member 16. Each strap 28 is provided with a slot 32 for receiving a bolt 33, for adjusting the elevation of the cutting edge relative to the screen 11 to provide the desired space between the cutting edge of said screen to compensate for slight wear of the underside of the cutting edge.

The leading end of the scraper blade (that end near the rim 15) is provided with an auxiliary scraper blade 34, comprising a pair of diverging plates 36 and 37 at an angle substantially of 150° with the lower end 38 of the plate 37 overlapping the inner face of the leading end of the flange 20 with lower edge 39 of its central portion resting on the central portion 41 and the lower end of the flange 36 resting on the triangular portion 26 as clearly shown in Fig. 2, the inner faces of the plates 36 and 37 being curved to form a deflector surface 42. The lower end of the outer face of the flange 37 is provided with a recess 43 for receiving the flange 20 (see Fig. 3). The upper end of the plate 36 is provided with a similar recess 44, whereby the plates 36 and 37 may be reversed end for end whenever the cutting edge 46 of the plate 36 becomes worn.

The back face of each of the plates 36 and 37 is provided with a vertical V-shaped rib 48 and 49 adapted to be mounted in a vertical groove 51 in the front face of the bar 23. A bolt 52 provides means for locking the plate 37 in operative position as illustrated in Figs. 2, 4 and 5. The bolt 52 is mounted in an opening 53.

From the above description it will be seen that the cutting edge 46 and the curved surface 42 provide means for directing material gathered on the inner face of the rim 15 of the pan 10 by centrifugal force, inwardly and longitudinally of the horizontal scraper bar 17 as the pan is rotated.

In order to prevent the material thus directed from being piled at the junction of the plate 37 and the scraper 17 and over flowing the top of the flange 20 I have formed on the front faces of the plates 36 and 37 what I shall call a mould flange 54 having curved portions 56 and 57 to cause the material gathered by the edge 46 to be rolled toward the center of the pan as the pan is rotated.

In the practical application of my invention, the scraper blade 17 is mounted diagonally of the line of rotation of the pan 10 with its leading end and the plate 36 adjacent to the rim 15 and the delivery end terminating near one of the mullers 13 and over hanging the crushing plate 12 as clearly illustrated in Fig. 1. The cutting edge 19 is slightly above the screen 11 and the under side of the flange 19 is inclined outwardly and upwardly as illustrated in Fig. 6. As the pan is rotated in an anti-clockwise direction, the material supported on said screen will be engaged by the upper surface of the flange 19 and caused to move toward the center of the pan by a rolling action as illustrated in Fig. 6 rather than by a sliding movement.

This rolling action results in the saving of a considerable amount of power required to operate the pan due to a reduction in the wedging action between the lower edge of the cutting flange 19 and the top of the screen. By placing the flange 19 in a slightly inclined horizontal position, the upper forward corner of the cutting edge becomes worn instead of the lower corner as is the case when a vertical blade is employed, as shown in Fig. 8. By rolling the material toward the center of the pan the material is moved transversely over the top of the cutting edge rather than longitudinally of the forward edge, as is necessary when a vertical blade is employed. In the latter case the material is moved toward the center of the pan by moving longitudinally of the diagonally mounted blade. In Fig. 8 the dotted lines 61 illustrate successive worn positions and the manner in which the cutting edge is automatically sharpened. The comparatively large volume of material moved transversely over the top of the flange causes the top corner to be worn away, while the lesser volume of less pressure passing under the lower corner causes the horizontal worn portion 62 to be formed, which, on account of the inclined under surface of the flange 19 is very short. The space between the cutting edge 19 being less than the width of the perforations in the screen, permits most of the material to fall through the screen and thus reduce the pressure applied to the underside of the cutting edge of the flange 19. The flanges are lowered by means of the bolts 33, as the cutting edge is worn away, to maintain the desired spacing between the cutting edge and the top of the screen.

It will be seen that when the flange becomes worn away the scraper flanges 19 and 20 may be moved to alternate positions thereby doubling the life of the scraper blade.

It will also be noted that the scraper illustrated in Fig. 6 uses a single locking rib 21 while the scrapers of the remaining figures use two locking ribs. It will also be seen that the position of the ribs and grooves might be reversed by placing the groove 22 in the block 17 and the rib 21 in the bar 23. It is believed that either type or arrangement of grooves and ribs may be used without departing from the spirit of my invention.

I claim:

1. In a machine for pulverizing solid materials including a rotatably mounted and horizontally arranged dry pan having an annular screen portion near its periphery and upright mullers near its central portion to crush and pulverize material carried by the pan as it is rotated beneath the mullers, the material being moved to position over the screen by centrifugal force, means for causing the coarser material to be moved toward the center of the pan as the pan is rotated, comprising, an elongated body having substantially the form of a right triangle in cross section with its hypotenuse side hollowed to form a curved deflector surface and tapered cutting flanges, means mounting the body with its longitudinal axis inclined relative to the line of rotation of said pan with one of its tapered cutting flanges slightly inclined outwardly and upwardly.

2. A scraper blade and means for mounting the same to operative position above a dry pan, comprising, an elongated horizontally supported body having an upright face, with a longitudinal groove in said face, an elongated scraper blade having substantially the shape of a right triangle in cross section with its hypotenuse side hollowed to form a curved deflector surface and tapering cutting flanges with each of its right faces provided with a longitudinal rib, and means for detachably fixing one of said right faces of said blade to the grooved face of said body with its rib mounted in the groove of said upright face.

3. In a machine for pulverizing solid materials including a rotatably mounted and horizontally arranged dry pan having an annular screen portion near its periphery and upright mullers near its central portion to crush and pulverize material carried by the pan as it is rotated beneath the mullers, the material being moved to position over the screen by centrifugal force, means for causing the coarser materials to be moved toward the center of the pan as the pan is rotated, comprising, an elongated body having substantially the form of a right triangle in cross section with its hypotenuse side hollowed to form a curved deflector surface and tapered cutting flanges, and means mounting the body with its longitudinal axis inclined relative to the line of rotation of said pan.

4. A scraper blade and means for mounting the same to operative position above a dry pan, comprising, an elongated horizontally supported body having an upright face provided with a longitudinal groove in said face near its lower edge, an elongated scraper blade having substantially the shape of a right triangle in cross section with its hypotenuse side hollowed longitudinally with the apex of its right sides provided with a longitudinal rib, and means for detachably fixing one of said right faces to the grooved face of said bar with its rib mounted in the groove of said bar.

5. A scraper blade and means for mounting the same to operative position above a dry pan, comprising an elongated horizontally supported body having an upright face provided with a longitudinal groove in its lower edge, an elongated scraper blade having substantially the shape of a right triangle in cross section with its hypotenuse side hollowed longitudinally with one of its right faces provided with a longitudinal rib mounted between its upper and lower edges, and means for detachably fixing said right face to the grooved face of said scraper supporting body with its corresponding rib mounted in the groove of said body.

6. In a device of the class described, a pan supporting frame, a dry pan mounted therein to rotate in a horizontal plane, a horizontally mounted bar above said pan and fixed to said frame, a scraper supporting body having an upright face provided with a longitudinal groove, means for adjustably mounting the scraper supporting body to the said supporting bar to move toward and from said pan, an elongated scraper blade having substantially the shape of a right triangle in cross section with its hypotenuse side hollowed to form a deflector surface and tapered cutting flanges with a portion of each of its right faces provided with a longitudinal rib, and means for detachably fixing one of said right faces of said blade to the grooved face of said body with its rib mounted in the groove of said bar.

7. A scraper blade for dry pans, comprising an upright blade, having a leading end, adapted to be supported above the top surface of the pan and diagonally of its line of movement, said blade having its lower edge terminating in a laterally and downwardly inclined position, means for gathering material from the inner face of the pan rim and delivering the same to the lead end of said scraper blade, comprising, an upright body consisting of diverging plates to form substantially a vertical curved deflecting surface, and means for clamping one of the plates adjacent to and in alignment with the leading end of said upright scraper blade with the other plate member inclined outwardly and laterally.

8. A reversible scraper blade and means for mounting the same to operative position above a dry pan, comprising an elongated horizontally supported body having an upright face provided with a longitudinal groove in its lower edge, an elongated scraper blade having substantially the shape of a right triangle in cross section with its hypotenuse side hollowed longitudinally with its faces formed symmetrical with their ends oriented longitudinally end for end, each of said right faces having a longitudinal rib parallel to and at an equal distance from the apex edge of said scraper blade, and means for detachably fixing either of said right faces of said blade to the grooved face of said scraper supporting body with its corresponding rib mounted in the groove of said body.

9. A reversible scraper blade and means for mounting the same to operative position above a dry pan, comprising an elongated horizontally supported body having an upright face provided with a longitudinal groove in face, an elongated scraper blade having substantially the shape of a right triangle in cross section with its hypotenuse side hollowed longitudinally to form a curved deflector surface and tapered cutting flanges, each having one end terminating in a triangular portion, said flanges being symmetrical with their ends oriented longitudinally end for end, each of said right faces having a longitudinal rib parallel to and equal distance from the apex edge of said scraper blade, and means for detachably fixing either of said right faces of said blade to the grooved face of said scraper supporting body with its corresponding rib mounted in the groove of said body.

10. In a device of the class described, an upright supporting body adapted to be supported above the top surface of the pan and diagonally of its line of movement, a scraper blade having its lower edge terminating in a laterally and downwardly inclined portion having a lead end, means for gathering material from the inner face of the pan rim and delivering the same to the lead end of said scraper blade, comprising an upright body consisting of diverging plate members to form substantially a vertical curved deflecting surface, a mold flange projecting laterally and transversely from the center of the curved deflector surface of said upright body, means for clamping one of said plate members to said body adjacent to and in alignment with the leading end of said upright scraper blade with the other plate member inclined outwardly and laterally.

11. In a device of the class described, an upright supporting body adapted to be supported above the top surface of the pan and diagonally of its line of movement, a scraper blade having its lower edge terminating in a laterally and downwardly inclined portion having a lead end, means for gathering material from the inner face of the pan rim and delivering the same to the lead end of said scraper blade, comprising an upright body consisting of diverging plate members to form substantially a vertical curved deflecting surface, a pair of oppositely curved mold flanges orientated end for end and projecting laterally and transversely from the center of the curved deflector surface of said upright body, and means for clamping either one of said plate members to said body adjacent to and in alignment with the leading end of said upright scraper blade with the other plate member inclined outwardly and laterally.

References Cited in the file of this patent

UNITED STATES PATENTS

| 612,247 | King | Oct. 11, 1898 |
| 1,337,333 | Simpson | Apr. 20, 1920 |